United States Patent [19]

Aichinger

[11] 4,309,612

[45] Jan. 5, 1982

[54] X-RAY DIAGNOSTIC GENERATOR WITH AN INVERTER SUPPLYING THE HIGH VOLTAGE TRANSFORMER

[75] Inventor: Horst Aichinger, Fuerth, Fed. Rep. of Germany

[73] Assignee: Siemens Aktiengesellschaft, Berlin & Munich, Fed. Rep. of Germany

[21] Appl. No.: 79,507

[22] Filed: Sep. 27, 1979

[30] Foreign Application Priority Data

Oct. 25, 1978 [DE] Fed. Rep. of Germany ....... 2846458

[51] Int. Cl.[3] .............................................. G03B 41/16

[52] U.S. Cl. .................................... 250/409; 250/402; 250/413

[58] Field of Search ............... 250/409, 408, 402, 322, 250/421, 413, 355

[56] References Cited

U.S. PATENT DOCUMENTS

| | | | |
|---|---|---|---|
| 2,837,657 | 6/1958 | Craig et al. | 250/322 |
| 3,567,940 | 3/1971 | Lambert | 250/409 |
| 3,828,194 | 8/1974 | Grasser | 250/408 |
| 4,021,672 | 5/1977 | Franke | 250/413 |
| 4,051,377 | 9/1977 | Kemner et al. | 250/409 |
| 4,063,099 | 12/1977 | Grassmé | 250/413 |

FOREIGN PATENT DOCUMENTS 2128248 1/1973 Fed. Rep. of Germany .

*Primary Examiner*—Craig E. Church

*Attorney, Agent, or Firm*—Hill, Van Santen, Steadman, Chiara & Simpson

[57] ABSTRACT

In order to regulate the dose rate, the pulse-pause ratio of the inverter is changed. For this purpose, the regulator can be designed in such manner that, within a predetermined range of the error signal it changes this pulse-pause ratio via a regulating unit and, upon transgression of this range, changes the peak voltage supplied to the inverter via a regulator unit upon constant maintenance of a minimum pulse-pause ratio.

1 Claim, 3 Drawing Figures

X-RAY DIAGNOSTIC GENERATOR WITH AN INVERTER SUPPLYING THE HIGH VOLTAGE TRANSFORMER

BACKGROUND OF THE INVENTION

The invention relates to an x-ray diagnostic generator with an x-ray tube, a high voltage transformer and an inverter supplying the high voltage transformer; the inverter is connected to a DC voltage source and has an adjustable pulse-pause ratio.

In an x-ray diagnostic generator of this type, it is possible to significantly reduce the size and weight of the high voltage transformer in contrast to that case in which it is supplied with mains frequency, when the inverter frequency lies in the mid-frequency range, for example between one and five kilohertz. It is known to adjust the x-ray tube voltage via the pulse-pause ratio of the inverter. To this end, a filter section is provided on the high voltage side, so that the voltage at the x-ray tube which is gained by means of rectification of the output voltage of the high voltage transformer depends for its peak value on the pulse-pause ratio of the inverter.

An x-ray diagnostic generator of this type is employable both for the production of x-ray exposures given stationary x-ray tubes and stationary radiation receivers, for example, x-ray film as well as for the production of x-ray tomographs wherein the exposure unit consisting of x-ray tube and radiation receiver is moved with reference to the exposure subject. In the latter case, it is necessary to keep the dose rate constant for an exposure-automated operation. It is thereby possible to attain an optimum film blackening (or density) by regulation of the dose rate applied to an x-ray film given an exposure time determined by the selected scanning path of the exposure unit.

SUMMARY OF THE INVENTION

The object of the invention is to design an x-ray diagnostic generator of the type initially cited in such manner that the dose rate of the x-radiation can be regulated.

This object is inventively achieved in that a regulating loop for the dose rate is present whose manipulated variable is the pulse-pause ratio of the inverter. In the inventive x-ray diagnostic generator, the dose rate can be regulated within a specific range given a constant peak voltage at the x-ray tube. Thus, the image contrast within this range does not change despite regulation of the dose rate. Upon transgression of the regulating range which is given by means of the change of the pulse-pause ratio, it is possible according to a further development of the invention to change the peak voltage of the inverter via a regulating unit while holding a minimum pulse-pause ratio constant. In this case, the pulse frequency must be equal to or greater than 150 Hertz so that the individual dose pulses cannot be resolved on the film produced by means of the layer scanning sequence. Given a minimum pulse-pause ratio of 1:4, the pulse width is 1.67 ms and the pulse interval is 6.7 ms. Thus, given 0.2s layer scan time, 30 dose pulses, for example, thus ensue.

In the following, the invention is explained in greater detail on the basis of an exemplary embodiment illustrated in the drawing; and other objects, features and advantages will be apparent from this detailed disclosure and from the appended claims.

DETAILED DESCRIPTION

Figure 1:
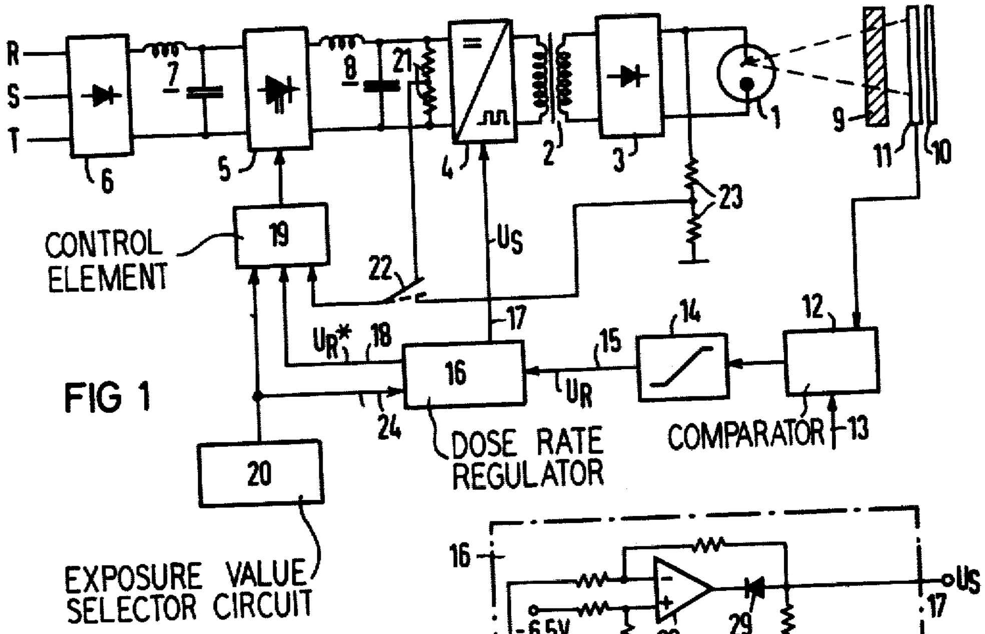
FIG. 1 shows the electric circuit of an x-ray diagnostic generator according to the invention.

The x-ray diagnostic generator according to FIG. 1 exhibits an x-ray tube 1 which is supplied by a high voltage transformer 2 via a high voltage rectifier 3. The primary winding of the high voltage transformer 2 is connected to an inverter 4 supplying a rectangular output waveform. The inverter 4 is connected via a DC chopper regulator 5 with a three phase rectifier bridge 6 which is connected to the three-phase power network. A filter 7 lies between the three -phase rectifier bridge 6 and the DC chopper regulator 5, and a filter 8 lies between the DC chopper regulator 5 and the inverter 4.

Exposures of an exposure subject 9 can be produced on an x-ray film in a film cassette 10. The x-ray diagnostic generator is conceived of as being for employment in conjunction with an x-ray planigraphic device in which the time for an x-ray exposure is rigidly prescribed by means of the sequence mechanism which selects the movement cycle of the exposure unit 1, 10. For automatic exposure, therefore, the dose rate is measured at the x-ray film. To this end, a measuring chamber 11 is present which supplies an output signal which corresponds to the actual value of the dose rate. This output signal is compared in a comparator 12 with set point value signal for the dose rate lying at the input 13, which set point value signal depends on the exposure time and produces an optimum film blackening (or density) within the exposure time. The comparator 12 drives a proportional-integral (PI) regulator 14 which generates a signal at its output 15, which signal depends on the error signal and is supplied to a dose rate regulator 16. The dose rate regulator 16 has two outputs 17 and 18. When the output signal of the PI controller 14 and, thus, the error signal lies within a predetermined range, the pulse-pause ratio of the inverter 4 is influenced as a manipulated (controlled) variable for effecting an adjustment of the actual value of the dose rate to the set point value via the signal $U_S$ at output 17. When this range is exceeded, then a minimum pulse-pause ratio of the inverter 4 (pulse frequency greater than 150 hertz) is retained and the DC chopper regulator 5 is influenced via the signal at output 18 via a control element 19 in the sense of a change of the input voltage of the inverter 4 and, thus, the peak voltage of this inverter is also influenced.

Both the dose rate regulator 16 and the control element 19 receive information concerning the selected set point value of the x-ray tube voltage from the adjustment means 20 for the exposure values. In this manner, a regulation of the inverter output voltage to a value corresponding to this set point value can ensue both before as well as during an exposure. Before an exposure, in this case, a voltage divider 21 which is connected with the control element 19 via an exposure switch 22 in the illustrated position serves as the actual value generator. During an exposure, a voltage divider 23 which is connected with the control element 19 via the exposure switch 22 then lying in its position indicated by means of a dash line serves as the actual value generator. In addition to planigraphic exposures, it is also possible to carry out general exposures in which the x-ray tube voltage is held constant and the dose rate regulation is switched off.

Figure 2:
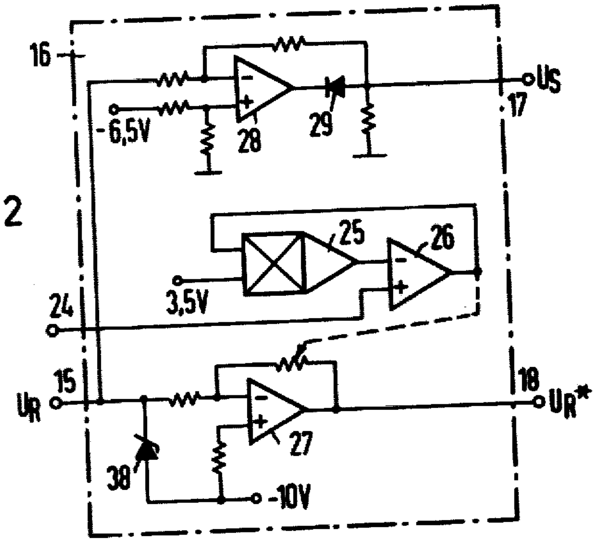
FIG. 2 shows the detailed construction of the dose rate regulator in the x-ray diagnostic generator according to FIG. 1.
Figure 3:
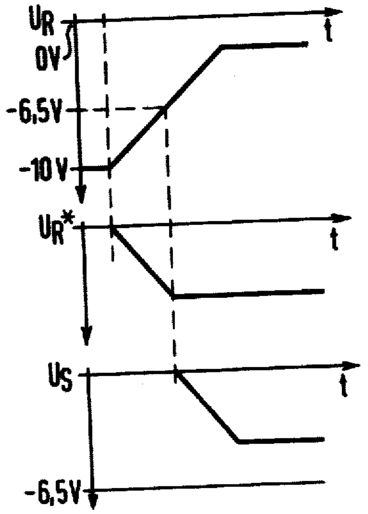
FIG. 3 shows curves for explaining the regulating function.

It proceeds from FIG. 2 in conjunction with the voltage curves of FIG. 3 that the dose rate regulator 16 exhibits a divider 25, 26 for the signal lying at input 24 which corresponds to the adjusted set point value of the x-ray tube voltage. The divider 25, 26 standardizes this signal and adjusts the gain of an operational amplifier 27 to a value which is equal to the quotient of the signal at input 24 and a fixed voltage of, for example, 3.5 volts. The adjustment can ensue, for example, by means of changing the feedback resistance of the operational amplifier 27.

Together with a Zener diode 38, the operational amplifier 27 sees to it that the output voltage of the operational amplifier 27, which is equal to the control voltage for the control element 19, corresponds to the negative set point value of the x-ray tube voltage in a range of $-6.5$ volts $\leqq U_R \leqq$ OV. In this range of the control voltage $U_R$, which corresponds to the error signal, the x-ray tube voltage is thus held constant and the regulation of the dose rate ensues by means of the signal at output 17 via the change of the pulse-pause ratio of the inverter 4 given a pulse frequency greater than 150 hertz. An operational amplifier 28 is connected as a subtractor and, in conjuntion with a diode 29, sees to it that, in the range $-6.5$ volts $\leqq U_R \leqq$ OV, the output voltage $U_S$ behind the diode 29 proceeds mirror-inverted between zero and minus 6.5 volts corresponding to the voltage at input 24. In this range, the dose rate regulation via a change of the pulse-pause ratio of the inverter 4. Thereby, the x-ray tube voltage is fixed by means of the voltage at output 18 of the dose rate regulator 16. For the range $-10$ volts $\leqq U_R < -6.5$ v, the output voltage $U_S$ behind the diode 29 is zero volts and the pulse-pause ratio is a constant 1:4. The dose rate is regulated via the x-ray tube voltage by means of changing the output voltage of the operational amplifier 27 between an initial value of, for example, 40 kV and the value set at the control console.

The illustrated principle of dose rate regulation is not only applicable to a rectangular waveform inverter but also to other types of inverters, for example, to an oscillating circuit inverter. In an oscillating circuit inverter, which is supplied directly from the power network via a rectifier without a DC chopper regulator, the regulation of the x-ray tube voltage is possible by a regulation of the frequency of the inverter, for its load curves are frequency-dependent. In each case, the x-ray tube current is rigidly set to the value admissible for the selected tomographic exposure time.

It will be apparent that many modifications and variations may be effected without departing from the scope of the novel concepts and teachings of the present invention.

I claim as my invention:

1. An x-ray diagnostic system with an x-ray tube, a high voltage transformer, an inverter supplying the high voltage transformer, the inverter having means for adjusting its pulse-pause ratio and a control loop means for controlling the output dose rate of the x-ray tube by varying the pulse-pause ratio of the inverter (4), the control loop means comprising a dose rate sensing means (11), dose rate reference means (13), comparator means (12) receiving signals from said sensing and reference means for generating an error signal and regulating means (5, 19) for regulating the inverter in such manner that, within a predetermined range of the error signal, the regulator means changes the pulse-pause ratio given a constant peak voltage being supplied to the inverter (4) and, upon transgressing this range, the regulator means changes the peak voltage supplied to the inverter (4) with constant maintenance of a minimum pulse-pause ratio.

* * * * *